April 17, 1934.   C. HAMBUECHEN   1,954,931
STORAGE BATTERY CHARGING SYSTEM AND APPARATUS
Filed Jan. 16, 1933
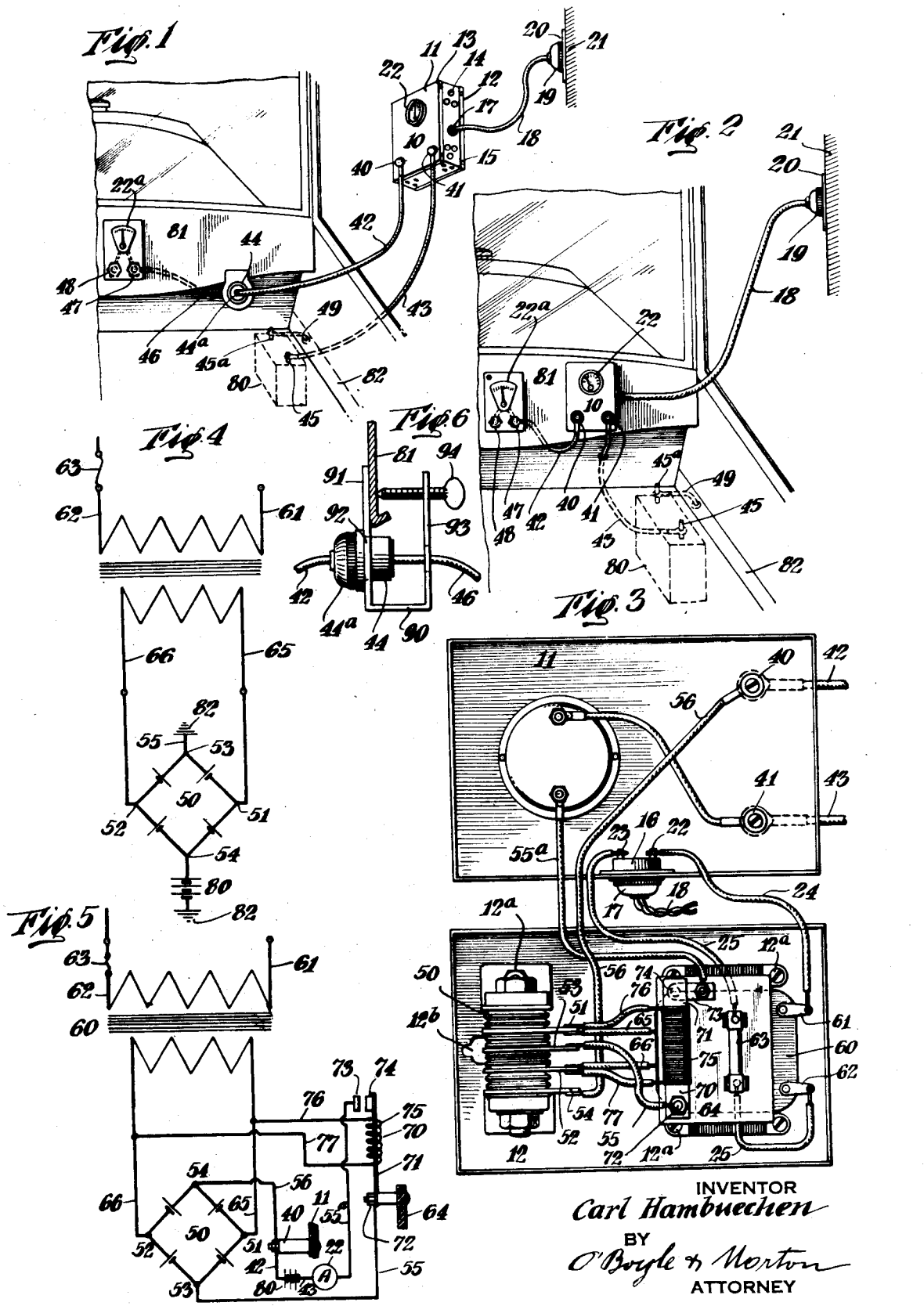
INVENTOR
Carl Hambuechen
BY
O'Boyle & Morton
ATTORNEY Patented Apr. 17, 1934

1,954,931

UNITED STATES PATENT OFFICE 1,954,931

STORAGE BATTERY CHARGING SYSTEM AND APPARATUS

Carl Hambuechen, Belleville, Ill.

Application January 16, 1933, Serial No. 652,067

4 Claims. (Cl. 171—314)

This invention relates to improvements in battery charging systems and apparatus, and more particularly to a method of and apparatus for opening the circuit between a rectifier and storage battery to prevent the discharge of the storage battery by slow leakage current through the rectifier.

In the use of copper sulphide and like film rectifiers, it has been found advisable in some instances to disconnect the rectifier from the storage battery to prevent draining of the battery because of leakage current passing through the rectifier. Among the methods which have been suggested for accomplishing this result are: use of a relay and the use of a four-prong plug, one pair of plugs being so arranged as to open and break the circuit between the rectifier and storage battery. The present day tendency is to install a variety of accessory electrical equipment on automobiles, airplanes, motor boats and other machines equipped with storage batteries, such as radios, lighters, spot lights, electric heaters, electric fans, and the like. A severe drain is thereby imposed on such battery systems in automobiles, boats, and airplanes, which, as noted above, were provided with battery systems adapted to take care of only the need of the electrical appliances supplied with the new equipment. The extra drain on storage batteries is further aggravated in rainy and cold weather due to the added load caused by hard starting.

It has now been found that the conventional storage batteries furnished with automobiles, boats, and airplanes, may be maintained at a desired current strength by the use of suitable charging devices connected to a suitable source of current, such as a house lighting system, and connected through a suitable rectifying and transforming means to the terminals of a battery which is to be serviced. The charging system contemplated comprises generally a rectifier unit with which may be incorporated a transformer, depending upon the type of battery used. The rectifier and/or transformer units may be adapted to be permanently mounted in automobiles, motor boats, or airplanes, or they may be installed in garages, hangars, boat sheds or on wharves. The rectifier units when mounted permanently in a garage, shop, hangar, or boat house, are provided with plugs connecting to the source of current and separate leads carrying the rectified current from the units to special polarized plugs which are adapted to engage detachable sockets mounted on the dash or instrument boards and grounded thereto, if desired. From the sockets, connections are made to the storage batteries which are to be charged.

As noted above, if the batteries are connected through a rectifier to a light socket, there is a tendency after the battery has been charged for the current to leak through the rectifier and discharge the battery during the time it is disconnected from the alternating current supply. This is overcome by inserting a suitable protective means such as a thermal relay across the line where no transformer is used, or across the primary or secondary circuit if a transformer is used. When alternating current is turned on the heating coil in the thermal relay heats the latter and closes the circuit between the rectifier and the storage battery. When the alternating current is shut off, the thermal relay cools off and automatically opens the circuit between the battery and the rectifier, thus preventing leakage of current from the battery to the rectifier.

By this novel method of opening the circuit between the battery and the rectifier when the alternating current supply is shut off, the batteries are always maintained at full charge by simply plugging in to the light circuit. By maintaining batteries at full charge there is no worry about run down storage batteries that are dead, when they are most needed, and in addition the batteries do not have to be taken out of the machine for charging. The improved battery charger may be connected to an ordinary light socket, where a permanent garage or shop installation is used, and the charger plug then inserted into a small detachable socket attached to the dash board of an automobile or other machine. Due to the novel features incorporated in this device, there is no danger of overcharging as the charge automatically tapers when the battery is fully charged. The device may be installed on an automobile very easily and quickly. The device is noiseless, has no tubes, and no liquids. There is nothing to get out of order, and there is no radio interference. The device is dry, durable, compact, and, as noted hereinabove, is adapted for permanent installation in any type of machine serviced by storage batteries, or it may be connected to a light socket in a garage, hangar, boat house, or shop, and used for maintaining storage batteries at full charge.

In addition to being used with the rectifier type of battery charging devices, the novel device of the present invention may be used as a remote control for charging a storage battery. In other words, by simply closing the alternating current circuit from a distant point, the device will operate to charge a storage battery irrespective of what type of charging device is being used. Storage batteries of any desired voltage can be charged by the method herein disclosed. While any type of rectifier may be used, desirable results have been obtained by the use of dry rectifiers of a type comprising copper sulphide discs abutted against aluminum or magnesium discs, a suitable number being arranged to form a rectifier and provided with appropriate current leads, as well as compressing means which may be a bolt and nut, in which event the discs and current leads may be mounted upon the bolt in any suitable manner.

While the novel charging device of the present invention has been described above in general terms, the concepts of this invention will be described with particular reference to the accompanying drawing, in which are disclosed devices embodying the patentably novel features of the present invention, both alone and in a variety of installations. Like numerals refer to similar parts throughout the several views, which are presented by way of illustration only, and Fig. 1 is an elevation partly in section of the dash board of an automobile showing the method of connecting a wall type rectifier to the automobile storage battery;

Fig. 2 is a view similar to Fig. 1 but showing the rectifier unit permanently mounted in place on the dash of an automobile;

Fig. 3 is an elevation of the rectifier assembly of Figure 2 with the cover removed and turned to one side to show assembly of the parts;

Fig. 4 is a wiring diagram of a rectifier-transformer assembly connected to a storage battery for charging same;

Fig. 5 is a view similar to Fig. 4 with a thermal relay cut in the battery charging circuit, and Fig. 6 is a side elevation of an improved dash board socket.

Referring more particularly to the drawing, the improved rectifier assembly of the present invention comprises a casing 10 having a cover and side portions 11, and a base 12. The cover and side portions may be secured together by means of eyelets 13, or it may be formed in one piece, if desired. For purposes of ventilation, apertures 14 may be provided in the side and end members. The cover may be secured to the back by means of screws or bolts 15. The cover is provided with an inlet socket 16 adapted to receive plugs 17, which serves as a terminal for the line current leads 18 which are connected through plugs 19 to any suitable outlet 20 mounted on a wall 21. An ammeter lamp, or other indicating device 22 may be mounted on the cover and terminals 40 and 41 for the rectified current may also be provided. The back may be provided with an aperture 12b adapted to engage a nail, hook or other device and be thereby detachably held in place on a wall.

The rectifier assembly is mounted on the back 12, and comprises a rectifier unit 50, a transformer unit 60, and a thermal relay 70. The input terminals 22, 23 of the socket 16 are connected to suitable leads 24, 25 to lugs 61, 62 forming the input or primary terminals of the transformer. A replaceable fuse 63 may be inserted in the line 25 as a safety device. The fuse and thermal relay may be mounted on insulated support 64 secured to the transformer in any desired manner. The transformer and the rectifier are secured to the supporting back of the casing by screws or bolts 12a.

The rectifier unit, if of the full-wave type as illustrated, is preferably provided with four terminals 51, 52, 53, and 54. The input terminals 51, 52 of the rectifier are connected to the secondary leads 65, 66 of the transformer.

The terminals 53, 54 of the rectifier unit are connected through suitable leads 55, 56 to the output terminals 40, 41 through the ammeter 22, if an ammeter be used. The terminals 40, 41 are in turn connected to leads 42, 43 which are respectively connected to a socket 44, and to a terminal 45 of a storage battery 80 mounted on an automobile. The socket 44 is clamped on the dash board 81 as shown, and is connected through lead 46 to an ammeter stud 47, the other side of the ammeter being connected through a stud 48 which latter is directly or indirectly grounded to the chassis. The chassis forms a common ground or return, and is designated generally by the numeral 82. Where the device is installed in or connected to airplanes and motor boats and like machines, which do not permit of ground connections, double outlet type rectifier units will be used, as indicated generally in Fig. 1, one side being connected to the ammeter and the other side to the battery. Lead 49 connects the chassis with the other pole 45a of a storage battery. As shown in Fig. 6 the socket 44 is adapted to receive a plug 44a which is shown as serving as a terminal for lead 42.

The socket 44 may be secured to a supporting member 90 having a front or face plate 91 formed with an aperture 92 adapted to receive the socket member 44. A rear leg or arm 93 is tapped at its upper portion to receive the pointed wing screw 94, which is adapted to clamp the face plate 91 against the dash 81. A toggle, clamp, or other suitable clamping device may be used in place of the screw connection 94. The use of a device of this character permits the servicing of storage batteries of all kinds directly in place in the several machines in which they may be installed without requiring, as noted above, the dislocation or removal of any of the parts of the machine.

It will be appreciated that when the current is passed through a transformer 60 and rectified by the rectifier unit 50, the storage battery 80 will become charged. The polarity of the current leads 42, 43 is, of course, checked before the battery is placed on charge. The charging of the battery being completed, it will be understood that if the rectifier remains connected to the battery through leads 55, 56 through a common return 82, the battery 80 may discharge itself by so-called leakage current through the elements of the rectifier 50.

By the insertion of a thermal relay 70 in the rectifier output line, the leakage of current from the charged battery to the rectifier is avoided. The thermal relay unit 70 comprises a thermostatic conductive metal member 71 secured at one end to a terminal post 72 mounted on the insulating support 64. The terminal post is connected to the rectifier lead 55, as shown in Fig. 3. In the showing in the drawing of Fig. 5, the battery 80 is shown inserted in the line 55 for purposes of simplifying the wiring diagram, and it is not intended to be restricted to the hook-up there shown. The lead 55a from the ammeter is connected to contact 73 with the contact 74 mounted on the free end of the thermostatic member 71. A resistance coil 75 is wound around or disposed about the heat-responsive thermostatic switch or relay member 71, current for actuating same being supplied, as desired, through leads 76, 77 from the leads 65, 66 of the rectifier input or output. This shunt circuit serves as a heater circuit for the thermostat switch or relay 70, and although shown connected to the secondary leads 65, 66 of the transformer 60, they may be severally connected to the primary leads 61, 62 of the transformer, or cut directly across the line if the rectifier 50 is connected directly to the 110 volt line as may be the case where 80 to 90 volt storage batteries are to be serviced.

Referring now to Fig. 2, the casing 10 is shown mounted on the dash of an automobile, although it may be incorporated therein without departing from the spirit or scope of the present invention. Where a permanent dash installation is made the ammeter 22a of the automobile instrument board may be directly connected in the rectifier circuit, and the ammeter 22 dispensed with. However, in order to provide a check on the operation of the apparatus, it is preferred to include a separate ammeter for the battery charger or booster, whether mounted on or in the dash or in a separate unit, as shown in Fig. 1.

It will readily be appreciated that by the insertion or incorporation of a thermal relay or switch in the circuit between a secondary battery and the rectifier unit of a battery charging circuit of the so-called booster battery type, which switch is closed only when the charging current is on, that the leakage or drain of the battery through the rectifier is completely avoided and rendered impossible. The thermal relay or switch may be directly operated by the line current or by current from either side of the transformer.

It will be observed that the use of the thermal relay in the present combination presents many advantages. By employing a thermal relay instead of any other particular type, the use of a small contact point becomes possible. This is advantageous because of the fact that a large sized contact point would have a tendency to increase arcing when the circuit is closed. The major advantage of the use of the thermal relay will be appreciated from the operation of the device. When the alternating current circuit is closed, it modifies or forms up the rectifier in the event that the rectifier is slightly short circuited due to moisture creeping in between the rectifying junction. This first surge or impulse of current puts the rectifier in good condition to take up the load as soon as the thermal relay closes the circuit. The thermal relay, therefore, not only serves to function as a circuit closing element but it performs this function with a time delay. The thermal relay, therefore, is a time delay switch enabling a beneficial preliminary action of the electric current on the rectifier. In the circuit of the present character, where no time delay switch is provided, the result would be a discharge of the battery through the rectifier for a certain interval of time until the alternating current had formed up the rectifier to its proper operating conditions. In the latter case, in certain circumstances, this would throw an overload on the transformer and cause excessive heating of the transformer.

It will now be appreciated that there has been provided an improved secondary battery charging system and apparatus, which is characterized by freedom from back drain or leakage, as well as ease of installation and manipulation, including the ability to mount same as a separate unit in garages, hangars, boat sheds, and the like, for servicing storage batteries of automobiles, airplanes and motor boats through the instrument panels of the same, and which includes further the desirable feature of being susceptible of mounting directly on instrument dash boards or included in the instrumentality forming a part thereof.

While certain novel features of the invention have been disclosed and are pointed out in the annexed claims, it will be understood that various omissions, substitutions and changes may be made by those skilled in the art without departing from the spirit of the invention.

What is claimed is:

1. In a rectifier system comprising a rectifier unit having connections to a source of line voltage and other connections to a battery to be charged, the improvements comprising a thermal relay operating with a definite time lag inserted between the battery and the rectifier.

2. In a rectifier system comprising a rectifier unit having connections to a source of line voltage and other connections to a battery to be charged, the improvements comprising a switch including a thermal relay inserted between the battery and the rectifier, said relay being controlled by a resistance connected across the feeder circuit and operating said switch with a definite time lag.

3. An improved battery charging device, comprising, in combination, a rectifier unit and a transformer associated therewith, means for connecting the transformer of said unit to a source of line voltage, other means for distributing rectified current from the rectifier to a battery to be charged, and switch means disposed between said battery and said rectifier for preventing back drain of the battery said switch means operating with a definite time lag during which time the rectifier is subjected to the action of alternating current to beneficially affect the rectifier.

4. An improved battery charging device, comprising, in combination, a dry rectifier unit and a transformer associated therewith, means for connecting the transformer of said unit to a source of line voltage, other means for distributing rectified current from the rectifier to a battery to be charged, and a thermostatic relay incorporated in said unit and interposed between said battery and said rectifier for preventing back drain of the battery said thermostatic relay operating with a lag so as to permit a short period action of the alternating current on the rectifier unit to beneficially modify the unit.

CARL HAMBUECHEN.